US006851866B2

(12) United States Patent
Kayama et al.

(10) Patent No.: US 6,851,866 B2
(45) Date of Patent: Feb. 8, 2005

(54) DRIVE UNIT FOR WHEEL AND ASSEMBLY METHOD FOR THE SAME

(75) Inventors: Shigeoki Kayama, Fujisawa (JP); Hideo Ouchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/917,859

(22) Filed: Jul. 31, 2001

(65) Prior Publication Data

US 2002/0044706 A1 Apr. 18, 2002

(30) Foreign Application Priority Data

| Jul. 31, 2000 | (JP) | ........................................ | 2000-230606 |
| Aug. 22, 2000 | (JP) | ........................................ | 2000-251318 |
| Jan. 15, 2001 | (JP) | ........................................ | 2001-006220 |

(51) Int. Cl.$^7$ ............................ F16C 43/04; F16C 35/00
(52) U.S. Cl. ........................ 384/584; 384/544; 384/589
(58) Field of Search ................................ 384/544, 589, 384/584; 403/359.1, 359.5, 359.6; 464/160, 906

(56) References Cited

U.S. PATENT DOCUMENTS

| 3,838,929 | A |   | 10/1974 | Burrell ........................ 403/365 |
| 4,881,842 | A | * | 11/1989 | Farrell et al. ............ 403/359.5 |
| 5,006,007 | A | * | 4/1991 | Fischer et al. ............ 403/359.5 |
| 5,046,596 | A |   | 9/1991 | Dennert .................... 192/106.1 |
| 5,131,782 | A | * | 7/1992 | Bruno et al. ............. 403/359.5 |
| 5,492,417 | A | * | 2/1996 | Baker et al. ................. 384/448 |
| 5,536,098 | A | * | 7/1996 | Schwarzler ................. 384/544 |
| 5,647,683 | A | * | 7/1997 | Easley ....................... 403/359.6 |
| 5,674,011 | A | * | 10/1997 | Hofmann et al. ........... 384/448 |
| 5,853,250 | A | * | 12/1998 | Krude et al. ................. 384/539 |
| 5,975,765 | A | * | 11/1999 | Kawamura .................. 384/537 |
| 6,413,008 | B1 | * | 7/2002 | van Dest et al. ............. 384/544 |

FOREIGN PATENT DOCUMENTS

| EP | 0936086 A2 | 8/1999 |
| JP | 63235029 | 9/1988 |
| JP | 2000-135903 | 5/2000 |
| WO | WO9927267 | 6/1999 |

* cited by examiner

Primary Examiner—Robert A. Siconolfi
(74) Attorney, Agent, or Firm—Crowell & Moring LLP (57) ABSTRACT

A combination of a constant-velocity joint and an axle unit for wheel-drive which comprises an outer race having an outer-ring raceway and being not rotatable even during use, a hub having an installation flange for supporting the wheel near the outside end, a first spline section and an inner-ring raceway near the inside end facing the outer-ring raceway, a drive member having a second spline section facing the first spline section, and a housing section forming an outer ring of the constant velocity joint, a plurality of rolling bodies between the outer-ring raceway and inner-ring raceway, the hub being engaged with the drive member by way of a spline connection with a pitch circle, and a coupling member adapted to freely deform elastically in the radial direction and located between and engaged with the first engagement section and the second engagement section so as to position the hub and drive member in the axial direction, wherein the clearance width in the circumferential direction on the pitch circle is controlled within the range of 0.001 mm to 0.10 mm.

1 Claim, 8 Drawing Sheets

DRIVE UNIT FOR WHEEL AND ASSEMBLY METHOD FOR THE SAME

FIELD OF THE INVENTION

The present invention relates to a drive unit for wheel or axle unit for wheel drive to rotatably support a wheel with respect to a suspension, and to transmit power that is output from a differential gear to the wheel.

BACKGROUND OF THE INVENTION

The drive unit for wheel comprises a rolling-bearing unit or hub unit for supporting the wheel, a constant-velocity joint unit and a coupling member, so as to support the drive wheel {front wheel for a FF vehicle (front engine, front-wheel-drive vehicle), rear wheel for a FR vehicle (front engine, rear-wheel-drive vehicle), and any wheel for a 4WD (four-wheel-drive vehicle)} that is supported by an independent suspension rotatably with respect to the suspension, whereby the drive unit for wheel drives and rotates the drive wheel.

A hub unit or axle unit for wheel drive which can be connected and disconnected to a constant-velocity joint is called "fourth generation hub unit".

In order to support a wheel such that it can rotate freely with respect to the suspension, various bearing units or axle units in which an outer race and inner race rotate freely by way of rolling bodies, have been used. Moreover, a rolling-bearing unit for wheel support that supports the drive wheel in an independent suspension, used together with a constant-velocity joint unit, must smoothly transmit (maintaining constant velocity) the rotation of the drive shaft to the wheel regardless relative displacement of the differential gear and drive wheel or the steering angle applied to the wheel. A bearing unit, or so called fourth-generation hub unit, which can combined in this way with a constant-velocity joint unit and which is relatively compact and lightweight, has been disclosed, for example in Japanese Patent Publication Tokukai Hei 7-317754, or U.S. Pat. No. 5,674,011.

Figure 6:
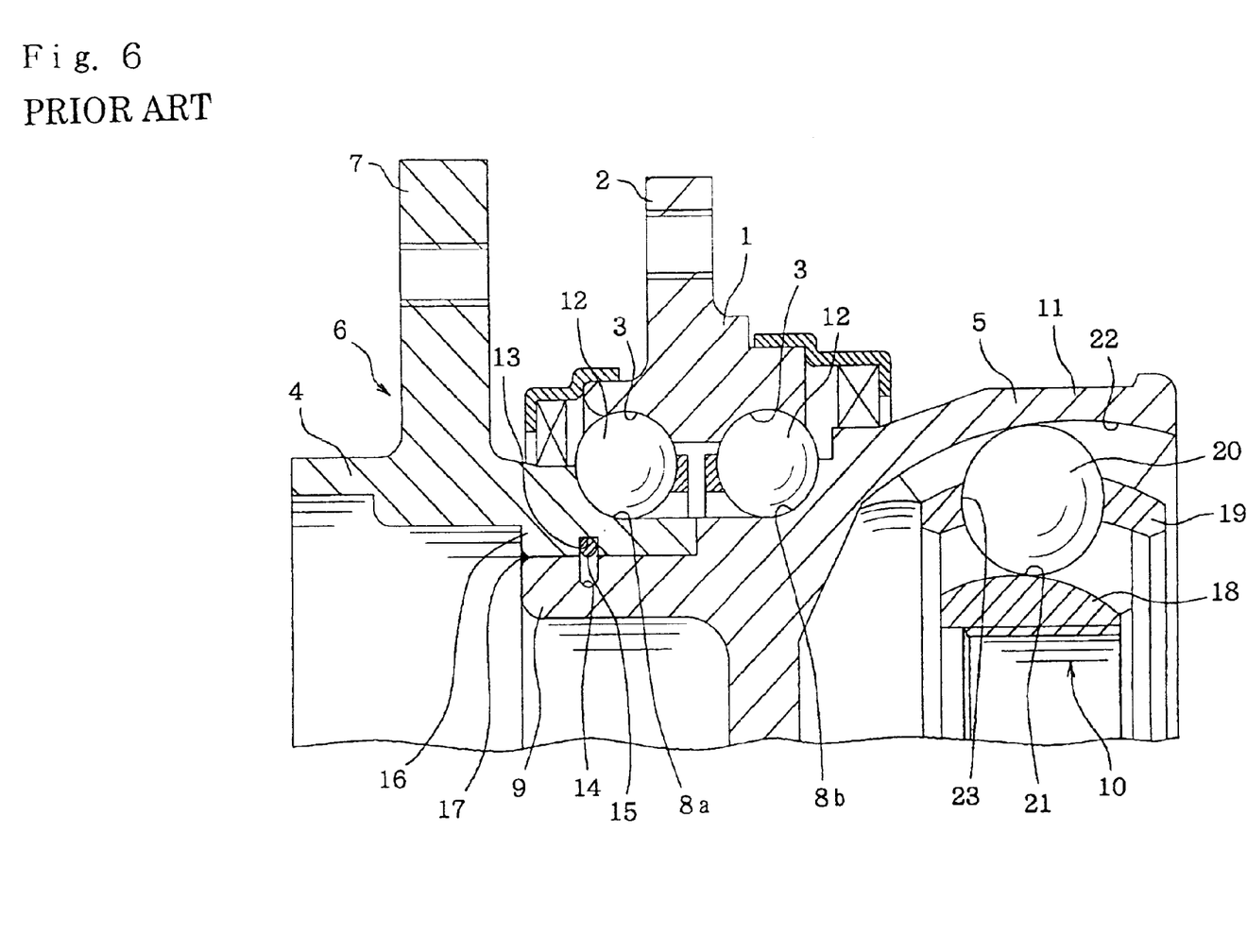
FIG. 6 is a partly cut-away, cross sectional view of a half of bearing unit for wheel drive of a first example of the conventional structure in the left end portion thereof.

FIG. 6 shows a first example of the prior construction as disclosed in Japanese Patent Publication Tokukai Hei 7-317754. The non-rotating outer ring 1 that is supported by the suspension, when installed in the vehicle, comprises a coupling flange 2 around the outer peripheral surface for connecting and fastening to the suspension, and a plurality of outer-ring raceways 3 formed around the inner peripheral surface thereof. On the radially inside of the outer race 1, there is a hub 6 comprising a first element 4 and second element 5. Of these, the first element 4 is formed in a cylindrical-shape on the whole such that there is an installation flange 7 formed around the outer peripheral surface on the side of the outside end (the outside end is the end on the outside in the width direction when installed in the automobile, and is the left end in the drawings of this patent), and a first inner-ring raceway 8a formed around the radially outer surface on the side of the inside end (the inside end is the end on the center side in the width direction when installed in the automobile, and is the right end in the drawings of this patent).

On the other hand, the second element 5 is formed such that there is a cylindrical section 9 on the outside end that fits radially inside the first element 4, and there is a housing section 11 on the inside end which functions as the outer ring of a Rzeppa-type or Barfield-type constant-velocity joint 10 on the bearing side, and there is a second inner-ring raceway 8b formed around its outer peripheral surface in the middle.

By placing a plurality of rolling bodies 12 between the outer-ring raceways 3 and the inner-ring raceways 8a, 8b, the hub 6 is supported radially inside the outer race 1 such that it can rotate freely.

Moreover, there are a radially outside fastening groove 13 on the inner peripheral surface of the first element 4 and a radially inside fastening groove 14 on the outer peripheral surface of the second element 5 in alignment in location with each other, and by placing a retaining ring 15 in engagement with both of these fastening grooves 13, 14, the first element 4 is prevented from coming apart from the second element 5.

Furthermore, welding 17 is performed between the outer peripheral edge of one end (left end in FIG. 6) of the second element 5, and the inner peripheral edge of the stepped section 16 formed around the inner peripheral surface of the first element 4, to connect and fasten the first and second elements 4, 5.

The constant-velocity joint 10 on the bearing side comprises the housing section 11, and inner ring 18, retainer 19, and a plurality of balls 20. Of these, the inner ring 18 is fastened to the end of the drive shaft (not shown in the figure) which is driven and rotated by the engine via the transmission.

On the outer peripheral surface of this inner ring 18, there are six inside grooves 21 that have an arc-shaped cross section when cut by an imaginary plane that is orthogonal to the center axis of the inner ring 18, and these inside grooves 21 are formed at equal intervals in the circumferential direction and are orthogonal to the circumferential direction.

Also, at positions on the inner peripheral surface of the housing section 11 that face the inside grooves 21, there are six outside grooves 22 that similarly have an arc-shaped cross section, and are formed such that they run orthogonal to the circumferential direction.

In addition, the retainer 19 is formed between the outer peripheral surface of the inner ring 18 and the inner peripheral surface of the housing section 11 such that it is entirely ring shaped with an arc-shaped cross section.

At six locations in the circumferential direction around this retainer 19, there are pockets 23 at positions in alignment with the inside and outside grooves 21, 22, respectively, and there is one ball 20 held inside each of these pockets 23. These balls 20, six in total, when held in the respective pockets 23, roll freely along the inside and outside grooves 21, 22, which may be referred to as "inside engagement groove and outside engagement groove", respectively.

When the rolling-bearing unit or axle unit for supporting the wheel constructed as described above and combined with a constant-velocity joint 10 on the bearing side, is installed in a vehicle, the outer race 1 is supported by the suspension by coupling flange 2, and the drive wheel is fastened to the first element 4 by the installation flange 7. Moreover, the end of the drive shaft or transmission shaft 53 (see FIG. 1 which shows a first embodiment of the present invention), which is rotated and driven by the engine via the transmission, is fastened inside the inner ring 18 of the constant-velocity joint 10 on the bearing side with a spline connection.

When the automobile is running, the rotation of the inner ring 18 is transmitted to the hub 6 including the second element 5 by way of the plurality of balls 20 to drive and rotate the drive wheel.

Figure 7:
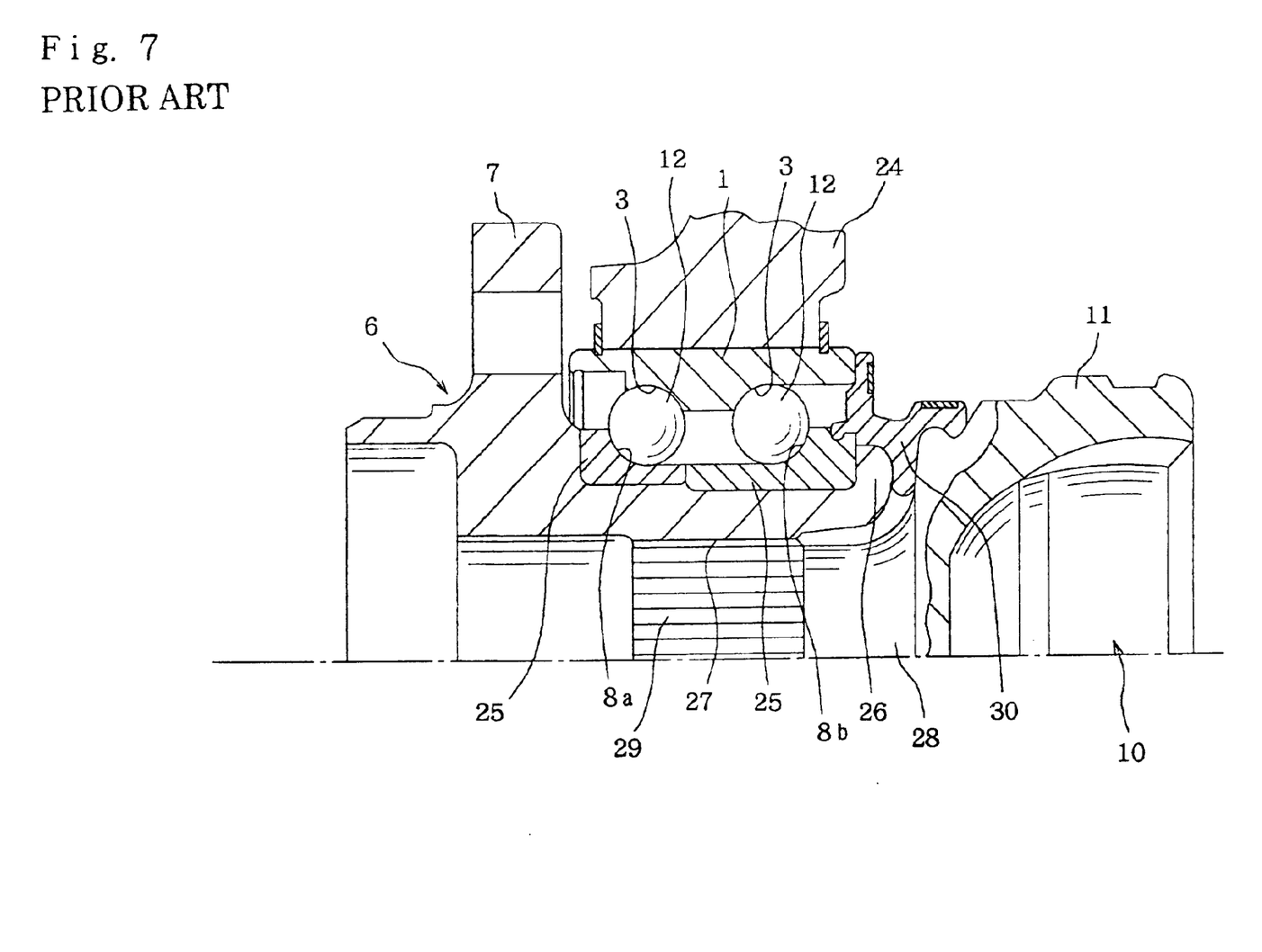
FIG. 7 is a partly cut-away, cross sectional view of a half of bearing unit for wheel drive of a second example of the conventional structure in the left end portion thereof.

FIG. 7 shows a second example of the prior construction as disclosed in U.S. Pat. No. 5,674,011. In this second example of prior construction, an outer race 1 that does not rotate during operation is fastened inside the knuckle 24 of the suspension, and outer-ring raceways 3 are formed around its inner peripheral surface.

Around the outer peripheral surface on the outside end of the hub 6, there is an installation flange 7 for supporting the wheel, and similarly on the inside end, there is a pair of inner races 25, so that a double row of inner-ring raceways 8 is formed. Both of these inner races 25 are fastened to and supported by the main portion of the hub 6 by a crimped section 26 that is formed by bending the inside end of the hub 6 outward in the radial direction.

In addition, a plurality of rolling bodies 12 are placed between the outer-ring raceways 3 and inner-ring raceways 8, to support the hub 6 radially inside the outer race 1 such that the hub 6 can rotate freely. Moreover, there is a spline hole 27 formed in the center section of the hub 6.

Furthermore, this hub 6 is combined with the drive member 28 which may form a "second constant-velocity joint" in the present specification, such that the hub 6 can be freely rotated and driven.

On one end of this drive member 28, there is a spline shaft 29 that is engaged with the spline hole 27. Also, the other end of drive member 28 is a housing section 11 that functions as the outer ring of a Rzeppa-type or Barfield-type constant-velocity joint 10 on the bearing side.

This kind of drive member 28 and hub 6 are combined by fitting the spline shaft 29 into the spline hole 27, and are prevented from coming apart by a coupling member 30 that is made of an elastic material, which is fitted in a land and recess engagement with a first and second engagement section, which are ring-shaped grooves, that are formed on the outer peripheral surfaces of the drive member 28 and hub 6 in an interlocking manner.

Furthermore, in Japanese Patent Publication Tokukai Hei 10-264605 and U.S. Pat. No. 5,853,250, the center section of the cylindrical-shaped hub is left as is hollow without inserting the spline shaft, making it possible to reduce the weight of the rolling-bearing unit or axle unit for wheel support.

Figure 8:
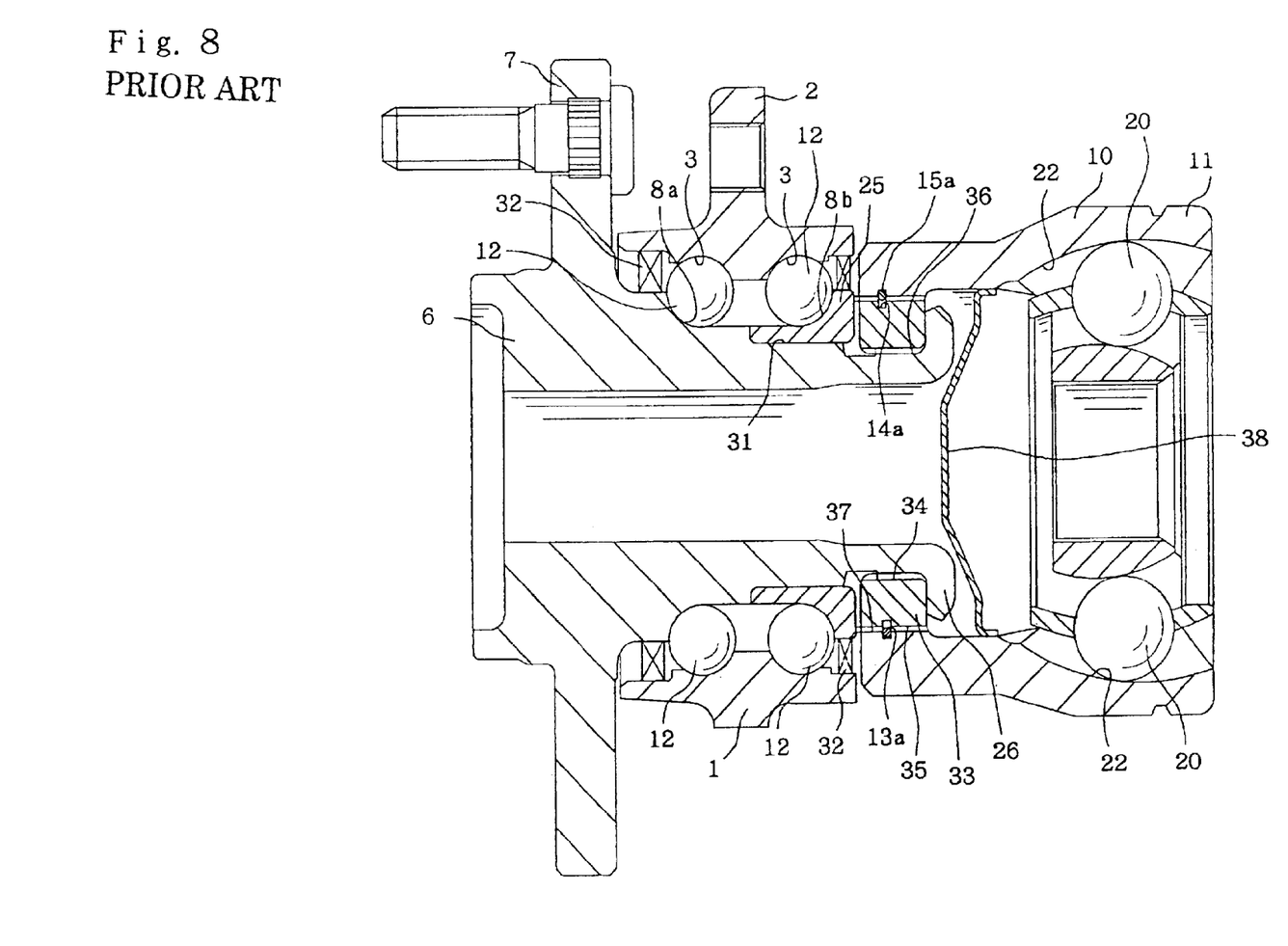
FIG. 8 is a partly cut-away, cross sectional view of a half of bearing unit for wheel drive of a third example of the embodiment of the conventional structure in the left end portion thereof.

FIG. 8 shows a third example of a conventional bearing unit for driving the wheels, which is similar to those disclosed in Japanese Patent Publication Tokukai Hei 10-264605 and U.S. Pat. No. 5,853,250.

When installed in the vehicle, the outer race 1, which does not rotate when supported by the suspension, has a coupling flange 2 formed around its outer peripheral surface, for connecting to and being supported by the suspension, and a plurality of outer-ring raceways 3 formed around its inner peripheral surface.

On the radially inside of this outer race 1, there is a hollow, cylindrical shaped hub 6 that is supported such that it is concentric with the outer race 1. This hub 6 has an installation flange 7 formed around its outer peripheral surface near the outside end for supporting the wheel, and similarly there is a first or outside inner-ring raceway 8a formed around the center section.

Moreover, there is a small-diameter step section 31 formed around the outer peripheral surface near the inside end of the hub 6, and an inner race 25, with a second or inside inner-ring raceway 8b formed on the inside around its outer surface, fits around and is fastened to the small-diameter step section 31.

In addition, rolling bodies 12 are placed between the outer-ring raceways 3 and inner-ring raceways 8a, 8b such that they can roll freely, and they support the hub 6 radially inside the outer race 1 such that it rotates freely.

Also, there are seal rings 32 placed between the inner peripheral surface on both ends of the outer race 1 and the outer peripheral surface of the middle section of the hub 6 and the outer peripheral surface on the inside end of the inner race 25, and they seal the openings on both ends of the space where the rolling bodies 12 are located.

On the inside end of the hub 6 there is a housing section 11 that functions as the outer ring of the Rzeppa-type or Barfield-type constant-velocity joint 10 (which can be referred to as "second constant velocity joint in this specification") on the bearing side, and it is connected to the hub 6 by way of an auxiliary ring 33 (which can function as a spacer).

On the inner and outer peripheral surfaces of this short, cylindrical shaped auxiliary ring 33, a radially inner female spline section 34 is formed on the inner peripheral surface, and a radially outer male spline section 35 is formed on the outer peripheral surface. This kind of auxiliary ring 33 is connected to the outer peripheral surface on the inside end of the hub 6 such that the radially inner male spline section 36 on the outer peripheral surface thereof and radially inner female spline section 34 are engaged with each other through a spline connection with no backlash.

Moreover, in this condition, the inside end of the auxiliary ring 33 is held by the crimped section 26 formed on the inside end of the hub 6, so that the auxiliary ring 33 is fastened to the inside end of the hub 6 with no backlash.

On the other hand, the radially outer female spline section 37 that is formed on the inner peripheral surface on the outside end of the housing section 11 is engaged through a spline connection with the radially outer male spline section 35 that is formed on the outer peripheral surface of the auxiliary ring 33.

Moreover, a plurality of outside grooves 22 for engagement are formed around the inner peripheral surface on the inside half portion of the housing 11, such that they function as the raceways for the balls 20 of the Rzeppa-type or Barfield-type constant-velocity joint 10 on the bearing side. In addition, an radially outer female spline section 37 is formed on the inner peripheral surface on the outside end. In this way, the radially outer female spline section 37 is connected with a spline fit with the radially outer male spline section 35 that is formed on the outer peripheral surface of the auxiliary ring 33.

Between the radially outer female spline section 37 and the radially outer male spline section 35 that are connected by a spline fit, there is a coupling member or retaining ring 15a, such that the housing section 11 and the auxiliary ring 33 are not separated. In other words, the retaining ring 15a formed in an open ring shape is located between and engaged with a first fitting section or inside fitting groove 14a that is formed around the entire outer peripheral surface of the auxiliary ring 33, and a second fitting section or outside fitting groove 13a that is formed around the entire inner peripheral surface on the end of the housing 11, such that the housing section 11 and auxiliary ring 33 do not shift or move in the axial direction. Moreover, a cap 38 made of pressed sheet steel is fitted and fastened to the inner peripheral surface in the middle section of the housing section 11 such that it blocks between the space where the plurality of balls 20 are located and the interior space of the hub 6 which runs to the outside in the axial direction.

In the case of the first example of prior construction shown in FIG. 6, the transmission of rotation between the first and second elements 4, 5 of the hub 6 must be performed in the section of the weld 17. In other words, it is necessary to transmit large torque for driving between the first element 4, which supports the wheel, and the second element 5, which is connected to the drive shaft, however, since the cylindrical surfaces of these elements 4, 5 fit together, it is not possible to transmit large torque through these fitting cylindrical surfaces.

Accordingly, it is necessary large torque be transmitted in the section of the weld 17, so that it is necessary that the strength of this weld section 17 is sufficiently large and thus this weld section must be welded using build-up welding all the way around.

However, when this weld section 17 is welded using build-up welding all the way around, the heat during welding causes the shape of the inner-ring raceway 8a, which is formed on the outer peripheral surface of the first element 4, to deform, and as a result the hardness of the section of this inner-ring raceway 8 decreases and it becomes impossible to sufficiently maintain the durability of the bearing unit which includes this inner-ring raceway 8a.

On the other hand, in both the second and third examples of prior construction shown FIG. 7 and FIG. 8, torque is transmitted from the constant-velocity joint 10 on the bearing side to the hub 6 by way of the spline connection. The term "spline connection or fit" is used to include the serrated connection or fit section, which has a finer pitch than the spline in this specification.

In other words, in the case of the second example of prior construction shown in FIG. 7, torque is transmitted by the spline connection between the female spline section formed on the inner peripheral surface of the spline hole 27, and the male spline section formed on the outer peripheral surface of the spline shaft 29, and in the case of the third example of prior construction shown in FIG. 8, the torque is transmitted by the spline connection between the radially outer male spline section 35 that is formed on the outer perineal surface of the auxiliary ring 33 and the radially outer female spline section 37 that is formed on the inner peripheral surface on the outside end of the housing section 11.

In the case of this construction for transmitting the torque by the spline connection, although there is not the problem that existed in the first example of prior construction shown in FIG. 6, the specifications of the spline connection section must be accurately regulated, otherwise installation of this spline connection would become troublesome and abnormal noise could occur during operation which would give discomfort to the passengers of the vehicle.

In other words, when making the fit between the female spline section and male spline section of the spline connection by way of interference fit, the work of fitting these spline sections together becomes troublesome, large assembly equipment is necessary and efficiency of the assembly work is decreased.

On the other hand, when there is an excessively loose fit between the female spline section and male spline section, there is a large clearance between the side surfaces in the circumferential direction of the spline teeth of both of these spline sections, so during acceleration or deceleration, these side surfaces in the circumferential direction hit each other with large momentum and may cause noise that could cause discomfort to the passengers of the vehicle.

SUMMARY OF THE INVENTION

An objective of the present invention is to provide a drive unit for wheel to do away with these problems by preventing noise from occurring due to relative displacement in the circumferential direction between the male and female spline sections, and improving the efficiency of assembly work.

Another objective of the present invention is to provide an axle unit for wheel drive to do away with these problems by preventing noise from occurring due to relative displacement in the circumferential direction between the male and female spline sections, and improving the efficiency of assembly work.

Another objective of the present invention is to provide a method of assembling such a drive unit for wheel.

DETAILED DESCRIPTION OF THE INVENTION

The drive units for wheel of this invention comprise a rolling-bearing unit for supporting the wheel, a constant-velocity joint unit and a coupling member.

Of these, the constant-velocity joint unit comprises a first constant-velocity joint of which its input section is connected to the output section of the differential gear, a transmission shaft of which its input end is connected to the output section of the first constant-velocity joint, and a second constant-velocity joint of which its input section is connected to the output end of the transmission shaft.

The rolling-bearing unit for wheel support comprises an outer race, a hub and a plurality of rolling bodies. The outer race has an outer-ring raceway on its inner peripheral surface, and does not rotate even during use.

Also, the hub comprises an installation flange for supporting a wheel which is formed on the outer peripheral surface of the hub near the outside end on the portion that protrudes outward from the outside edge of the outer race, an inner-ring raceway that is formed near the inside end of the hub such that it faces the outer-ring raceway, directly or by way of an inner race, and a first spline section that is formed on a first fitting peripheral surface. Furthermore, the rolling bodies are located between the outer-ring raceway and inner-ring raceway such that they roll freely.

On the other hand, the second constant-velocity joint comprises a second fitting peripheral surface that is located at the outside end where the second spline section is engaged with the first spline section with a spline fit, and a housing section on the inside end that functions as the outer ring of the constant-velocity joint on the bearing side.

In addition, the coupling member freely deforms elastically in the radial direction and is located between and engaged with the first fitting section that is formed on the peripheral surface of the hub and the second fitting section that is formed on the peripheral surface of this second constant-velocity joint, so that it positions the hub and second constant-velocity joint in the axial direction.

In the case of the drive unit for wheel of a first feature, the clearance angle of the spline connection between the first and second spline sections engaged with each other is regulated with the range 0.2' (0.2 minutes) to 26' (26 minutes) {in the case of drive unit for wheel of a typical passenger vehicle, this corresponds to the clearance width of 0.001 mm to 0.10 mm in the circumferential direction of the pitch circles the diameter of which is approximately 26.458 mm}.

Moreover, in the case of the drive unit for wheel of a second feature, the clearance angle of the spline connection between the first and second spline sections engaged with each other is regulated with the range 0.2' (0.2 minutes) to 42' (42 minutes) {in the case of drive unit for wheel of a typical passenger vehicle, this corresponds to the clearance width of 0.001 mm to 0.16 mm in the circumferential direction of the pitch circles the diameter of which is approximately 26.458 mm}.

Furthermore, in the case of the drive unit for wheel of a third feature, as to the first and second spline sections, the spline section that is formed on the inner peripheral surface is a parallel spline of which the spline teeth of that spline section are formed parallel with the center axis of the hub and second constant-velocity joint.

On the other hand, of the first and second spline sections, the spline section that is formed on the outer peripheral surface is an inclined spline of which the spline teeth of that spline section are slightly inclined (for example, 6' to 14', with 10' being the center value) with respect to the direction of the center axis of the hub and second constant-velocity joint.

In addition, the clearance angle of the spline connection between the first and second spline sections engaged with each other is regulated with the range −17' to 42' {in the case of drive unit for wheels of a typical passenger vehicle, this corresponds to the clearance width of −0.06 mm to 0.16 mm in the circumferential direction of the pitch circles the diameter of which is approximately 26.458 mm}. The negative clearance means the interference fit condition.

In each of the cases, in accordance to the processing precision of each part, the teeth of the male spline section around the circumference of the spline connection do not all come in contact with the female spline teeth at the same time. Accordingly, the clearance angle referred to here is the maximum angle obtained when the male and female spline sections are connected with each other through a spline fit and where one spline section is fixed and the other spline section is twisted from the state of contact between at least one pair of male and female spline teeth at the side surfaces, in the opposite direction to where at least one pair of male and female spline teeth come in contact with each other at the side surfaces such that the other spline section can be freely twisted without receiving large resistance due to the elastically deformed spline teeth.

On the other hand, in the case of the assembly method of the drive unit for wheel of another feature, the connection section that is formed on the outer peripheral surface of at least one of the drive shaft member with the housing and the transmission shaft is grasped by a robot arm, and the robot arm is moved with the second constant-velocity joint and rolling-bearing unit for wheel support supported such that they do not move in the retracting direction due to the robot arm movement, so that the second constant-velocity joint is engaged with the rolling-bearing unit for wheel support through a spline fit.

In the case of the drive unit for wheel of this invention, constructed as described above, torque transmission between the second constant-velocity joint and the hub is performed by the spline fit between the first and second spline sections.

Accordingly, there is no need to perform processing such as build-up welding all the way around the circumference, which is otherwise required and may cause thermal distortion etc. in order to positively perform torque transmission between the second constant-velocity joint and hub, thus making it possible to maintain the durability of every part of the bearing unit, including the inner-ring raceways.

Particularly, in the case of this invention, the clearance angle that is a size of the clearance in the circumferential direction of the spline connection is properly regulated, so there is no decrease in efficiency of the assembly work, and it is possible to prevent impact with great momentum between the sides in the circumferential direction of the spline teeth, and thus it is possible prevent the generation of uncomfortable noise.

In other words, in the case of the invention in the first and second features, the clearance angle is taken to be 0.2' (0.2 minutes) or greater (or 0.001 mm or greater when converted to the clearance in the circumferential direction for a pitch circle with a diameter of approximately 26.458 mm), so the fit condition between the first and second spline sections is not the interference fit, and even when both surfaces of the spline teeth of both spline sections are parallel splines that are formed parallel with the center axis of the hub and second constant-velocity joint, the work of performing the spline connection between both spline sections can be performed easily without having to use special assembly equipment.

On the other hand, since the clearance angle is kept up to 26' (26 minutes) (or up to 0.10 mm when converted to the clearance width in the circumferential direction for a pitch circle with a diameter of approximately 26.458 mm) in the first feature or up to 42' (42 minutes) (or up to 0.16 mm when converted to the clearance width in the circumferential direction for a pitch circle with a diameter of approximately 26.458 mm) in the second feature, it is possible to prevent impact with great momentum between the sides in the circumferential direction of the spline teeth at the beginning of acceleration or the beginning of deceleration, and thus it is possible to prevent the generation of noise that would be unpleasant for the passengers.

When the clearance angle is up to 26' (26 minutes) (up to 0.10 mm in the clearance in the circumferential direction), the level of noise is hardly noticed supposing noise is generated. Moreover, when the clearance angle exceeds 26' (26 minutes), as long as it is up to 42' (42 minutes) (up to 0.16 mm in the clearance in the circumferential direction), there are no practical problems even when a noise is generated.

Furthermore, in the case of the drive unit for wheel in the third feature, the spline section that is formed on the outer peripheral surface is an inclined spline, and the clearance angle of the spline connection is regulated within the range −17' to 42', so that there is no adverse effect on the assembly work, and it is possible to prevent impact with great momentum between the sides in the circumferential direction of the spline teeth, as well as prevent the generation of uncomfortable noise.

In other words, the minimum value of the clearance angle is negative (−), and so in the case that a small range is used within this clearance angle range, when the spline connection is completely assembled, there is an interference fit between the first and second spline sections. In this case as well, from the start of the spline connection between these spline sections until the spline connection is partially made, the fit condition between both spline sections is a clearance fit.

Making the interference fit is done in the final stage of the engagement process, and the interference fit occurs at only a portion in the axial direction. Therefore, the work of connecting both of the spline sections with a spline connection can be performed easily without the need of special assembly equipment. When the fit condition of the engagement between the spline sections is a strong interference fit that exceeds −17' (the inventors confirmed it in tests at −18' and −20'), the point during the engagement process when the fit condition changes from a clearance fit to an interference fit is earlier, and the interference in the final stage becomes so excessive that it has an adverse effect on the assembly work.

When the clearance angle is −17' to 0' (the inventors confirmed it through tests at −17', −15', −10', −5" and 0'), there is no adverse effect on the assembly work, and it is possible to prevent the generation of noise. On the other hand, when the clearance angle is greater than 0' and up to 42' (the inventors confirmed it through tests at 0.2', 3', 8', 16', 26', 34', 39' and 42'), noise was generated by the spline connection, however it was kept at a level that caused no practical problems.

Particularly, when the clearance angle was less than 26', the amount of noise generated was at a level that was hardly noticed. On the other hand, when the clearance angle became larger than 42' (the inventors confirmed it through tests at 44', 47' and 52'), the amount of noise generated by the spline connection became very large.

Furthermore, with the assembly method for the drive unit for wheel in the another feature, the work of assembling the pair of members together with a spline connection, or in other words, the second constant-velocity joint and the rolling-bearing unit for wheel support can be performed steadily by a robot arm, improving the efficiency of the assembly work.

In another feature of the present invention, an axle unit for wheel-drive like a conventional axle unit comprising an outer race, a hub, a drive member, a first engagement section, a second engagement section, a coupling member and a plurality of rolling bodies. The outer race has an inner peripheral surface formed with an outer-ring raceway thereon, and is not rotatable even during use. The hub has an installation flange for supporting the wheel which is formed on the outer peripheral surface of the hub near the outside end on a portion that protrudes outward from the outside edge of the outer race, an inner-ring raceway that is formed near the inside end of the hub such that it faces the outer-ring raceway, directly or by way of an inner race, and a first spline section that is formed on a first fitting surface. The drive member has an outside end and inside end, the outside end being formed with a second fitting peripheral surface formed with a second spline section engaged with the first spline section, and the inside end formed with a housing section which is the outer ring of a constant velocity joint. The rolling bodies are rotatably located between the outer-ring raceway and inner-ring raceway. The first engagement section is formed on a peripheral surface of the hub while the second engagement section is formed on a peripheral surface of the drive member.

The coupling member is located between and engaged with the first engagement section and the second engagement section so as to position the hub and second constant-velocity joint in the axial direction. The clearance width in the circumferential direction on the pitch circle in the spline connection between the first and second spline sections is controlled within the range of 0.001 mm to 0.10 mm in the axle unit for wheel drive in the present invention. If the clearance width is exceeds 0.10 mm, fretting wear may be produced on the circumferential side surface of the spline teeth to increase the clearance width.

With the axle unit for wheel drive of the present invention constructed and operated as mentioned above, the torque transmission between the drive member and the hub is conducted based on the spline connection between the first and second spline sections.

Accordingly, there is no need to perform processing such as build-up welding all the way around the circumference, which is otherwise required and may cause thermal distortion etc. in order to positively perform torque transmission between the second constant-velocity joint and hub, thus making it possible to maintain the durability of every part of the axle unit, including the inner-ring raceways.

Now, preferred embodiments of the present invention are detailed referring to the attached drawings.

Figure 1:
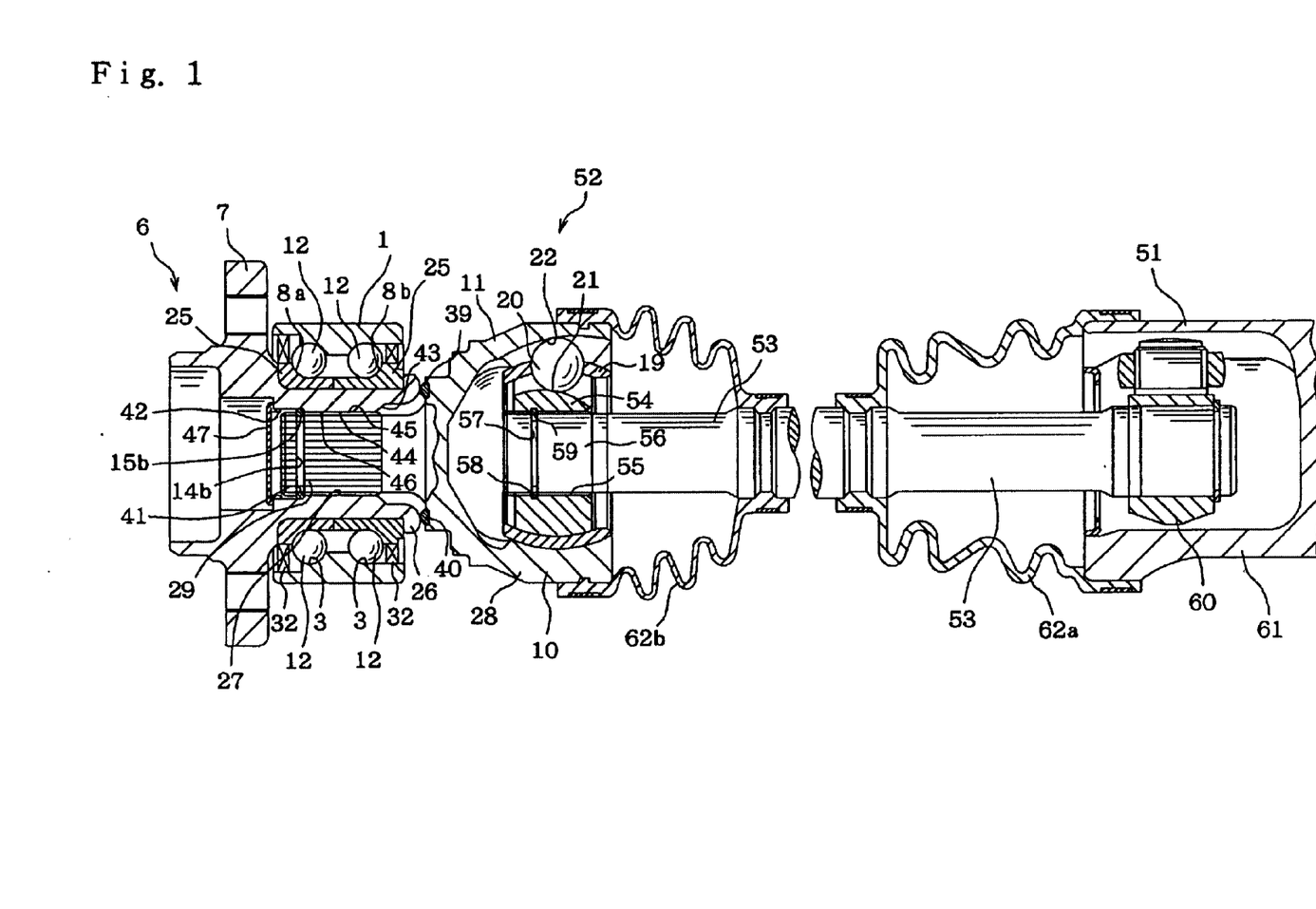
FIG. 1 is a partly cut-away, cross sectional view of a first example of the embodiment of the present invention.
Figure 2:
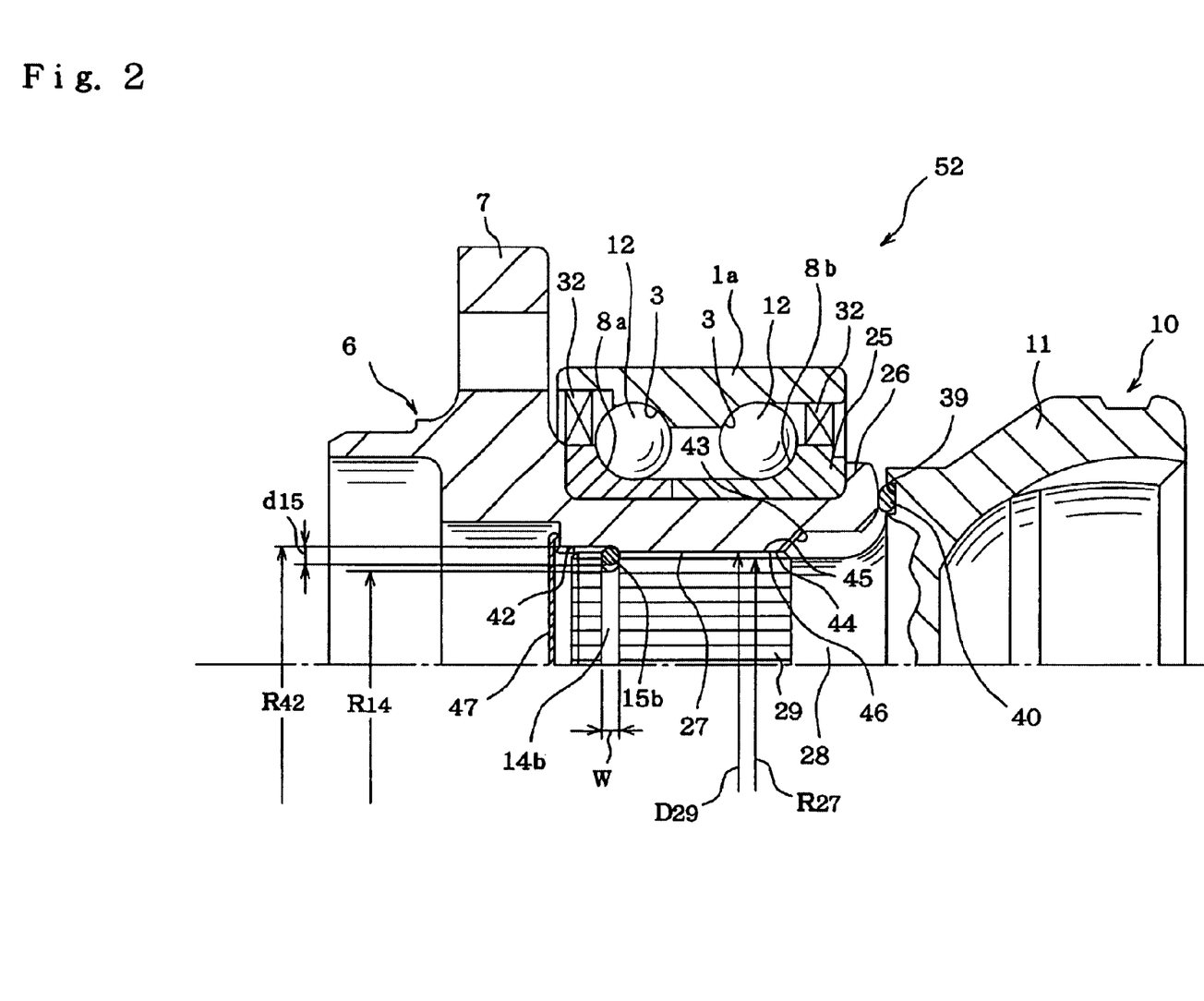
FIG. 2 is a partly cut-away, cross sectional view of a half of bearing unit for wheel drive of the first example in the left end portion of FIG. 1.

FIG. 1 and FIG. 2 show a first embodiment of this invention. As shown in FIG. 1, the drive unit for wheel of this invention comprises a constant-velocity joint 51 on the differential side which can be referred to as the first constant-velocity joint, a bearing unit or axle unit 52 for driving a wheel, and a transmission shaft 53. This bearing unit or axle unit 52 for driving the wheel comprises a constant-velocity joint 10 on the bearing side which can be referred to as the second constant-velocity joint.

The constant-velocity joint 10 on the bearing side, the constant-velocity joint 51 on the differential side, and the transmission shaft 53 form a constant-velocity joint unit. In the case of this embodiment, the bearing unit 52 for driving the wheel is similar to that in the second example of prior construction shown in FIG. 7, in that the outer peripheral surface of the outer race 1 is formed in a simple cylindrical shape, and when fastened to the suspension, the outer race 1 fits inside an installation hole formed on a knuckle 24 (see FIG. 7).

However, the outer race may also have a connection flange 2 around its outer peripheral surface as shown in FIGS. 6 and 8. Also, a plurality of inner-ring raceways 8a, 8b are formed around the outer peripheral surface near the inside end of the hub 6, such that the inner-ring raceways 8 are formed around the outer peripheral surface of a pair of inner races 25, and the inner races 25 are fitted around the main portion of the hub 6 and secured by a crimp section 26.

Moreover, a first spline section or female spline section 44 is formed around the inner peripheral surface, that is a first fitting peripheral surface, of a spline hole 27 that is formed in the center of the hub 6.

On the other hand, the second spline section or male spline section 45 is formed around a first fitting peripheral surface, which is the outer peripheral surface of a spline shaft 29 that is formed on the outside end of the drive member 28 of the constant-velocity joint 10 on the bearing side.

When this male spline section 45 is engaged with the female spline section 44, the end surface of the crimped section 26 comes in contact with or very close to the outside end surface of the housing section 11 of the drive member 28.

In addition, an O-ring 40, which is held in a support groove 39 that is formed on the outside end of the housing section 11, comes in contact elastically with the end surface of the crimped section 26 and forms a seal between this crimped section 26 and the housing section 11.

In this embodiment of the invention, by bringing the end surface of the crimped section 26 in contact with or very close to the outside end surface of the housing section 11 of the drive member 28, the spline shaft 29 is prevented from greatly displacing in the left direction from the state shown in FIG. 1 and FIG. 2 with respect to the spline hole 27.

In addition, in this embodiment of the invention, the first engagement section, that is formed on the side of hub 6, functions as a stepped section 41 that is formed on the edge of the outside end of the spline hole 27 on the inner peripheral surface of the hub 6.

When assembling the bearing unit for wheel drive, or in other words, when connecting the rolling-bearing unit or axle unit for wheel support with the constant-velocity joint unit, the coupling member or retaining ring 15b is held by the second engagement section or inside groove 14b that is formed around the outer peripheral surface of the spline shaft 29, and engaged with the stepped section 41 so as to prevent the spline shaft 29 from coming out of the spline hole 27.

The retaining ring 15b is made of an elastic metal wire such as spring steel, stainless steel for spring wire that is formed into a C-shaped open-ring shape such that its diameter can freely expand and constrict elastically.

The outer diameter $D_{15}$ of this kind of retaining ring 15b in the free state (not shown in the figure) is larger than the diameter $R_{27}$ of the maximum inscribed circle of the spline hole 27 (the addendum circle of the spline hole 27) ($D_{15}>R_{27}$). Also, the diameter $R_{14}$ of the bottom of the inside fitting groove 14b, and the inner diameter $R_{42}$ of the cylindrical surface section 42 on the side of the stepped section 41 opposite to the spline hole 27 are regulated such that the retaining ring 15b is placed between and engaged with the inside fitting groove 14b and the stepped section 41.

In other words, the diameter $R_{14}$ of the bottom of the inside fitting groove 14b is a value that is less than or equal to the diameter $R_{27}$ of the inscribed circle of the spline hole minus two times the diameter $d_{15}$ of the wire of the retaining ring 15b ($R_{14} \leq R_{27}-2d_{15}$). The diameter $R_{14}$ must be regulated in this way in order that the spline shaft 29 with the retaining ring 15b can be freely inserted into the spline hole 27 in the state where the retaining ring 15b is pressed to the bottom of the inside fitting groove 14b.

Moreover, the inner diameter $R_{42}$ of the cylindrical surface section 42 is less than the sum of the diameter $D_{29}$ of the circumscribed circle of the spline shaft 29 (the addendum circle of the spline shaft 29) plus two times the diameter $d_{15}$ of the wire of the retaining ring 15b.

The diameter $R_{42}$ must be regulated in this way in order that the inner peripheral edge of the retaining ring 15b is engaged with the inside fitting groove 14b in the state where the diameter of the retaining ring 15b is expanded elastically. It is preferred that the inner diameter $R_{42}$ of cylindrical surface section 42 be regulated such that the retaining ring 15b is in the center in the radial direction of the engagement section between the spline hole 27 and the spline shaft 29 in the state where the outer edge of the retaining ring 15b and the inner peripheral surface of the cylindrical surface 42 are in contact with each other.

The dimensions of the inside fitting groove 14b, the cylindrical surface section 42 and the retaining ring 15b are regulated as described above, and so, when the spline shaft 29 is inserted into the spline hole 27 with the retaining ring 15b fitted into the inside fitting groove 14b, the hub 6 and drive member 28 can be joined together such that they do not come apart.

In other words, when joining the hub 6 and the drive member 28, the spline shaft 29 is inserted into the spline hole 27 from the inside toward the outside, or from the right to left in FIGS. 1 and 2, with the retaining ring 15b fitted inside the inside fitting groove 14b. The insertion work is normally performed by an assembly robot. When performing this insertion by an assembly robot, the outer peripheral surface of the housing section 11, or the outer peripheral surface of the transmission shaft 53 is grasped by the assembly robot, so that the spline shaft 29 is inserted into the spline hole 27. When performing this insertion work, the spline shaft 29 and spline hole 27 are placed such that they are as concentric as possible, and then the spline shaft 29 is inserted straight into the spline hole 27.

During insertion, the retaining ring 15b is guided by the conical concave guide surface 43 that is formed next to the inner peripheral surface of the crimped section 26 and the inside end of the spline hole 27 such that the outer diameter is elastically constricted as it is pushed inside the spline hole 27.

Moreover, when the inside fitting groove 14b and the stepped section 41 are aligned with each other, the diameter of the retaining ring 15b elastically expands until the outer peripheral edge of the retaining ring 15b comes in contact with the inner peripheral surface of the cylindrical surface 42.

Also, when the diameter of the retaining ring 15b has elastically expanded, the retaining ring 15b is placed between and engaged with the inside fitting groove 14b and the stepped section 41 so as to prevent the spline shaft 29 from coming out of the spline hole 27, as well as connects the hub 6 to the drive member 28 such that they cannot come apart. The inclination angle of the guide surface 43 with respect to the axial direction of the hub 6 must be such that the retaining ring 15b can smoothly pass over this guide surface 43, and 30 degrees or less is preferable.

The width W of the inside fitting groove 14b must be greater than the diameter $d_{15}$ of the wire of the retaining ring 15b, however, the difference between the width W and the diameter $d_{15}$ should be as small as possible. The reason for this is to keep any backlash in the axial direction of the coupling section of the fitting groove 14b and retaining ring 15b to a minimum.

Furthermore, in this embodiment, a cap 47 fits inside the center section of the main body of the hub 6 such that it comes close to and faces the end surface of the spline shaft 29 and covers the center of the hub 6.

In this embodiment, constructed as described above, the volume of the space, where the spline shaft 29 and spline hole 27 are located in the section between the cap 47 and O-ring 40, is decreased, and since the amount of grease used to fill this space is reduced, it is possible to reduce the cost. The grease is used as a lubricant to prevent friction wear in the spline connection of the spline shaft 29 and spline hole 27.

Before fitting the cap 47 into the hub 6, it is best to check whether or not the retaining ring 15b is securely fitted with the stepped section 41 so that the hub 6 and drive member 28 do not come apart from each other during operation. This check can be performed by applying a 200 N load inward on the outside end surface of the spline shaft 29 of the drive member 28, or by tapping the outside end surface with a plastic hammer.

In the case that the spline shaft 29 is inserted by an assembly robot, a process is set in which the assembly robot applies a several thousand N load in the removal direction to the drive shaft member 28 immediately after insertion. In either case, if the drive shaft member 28 displaces with respect to the hub 6 in the removal direction, then the engagement of the retaining ring 15b and the stepped section 41 is deemed to be not proper and assembly should be performed again, or if it should be disposed of as defective.

In this embodiment, having the basic construction described above, the clearance angle of the spline connection section 46, where the female spline section 44 is engaged with the male spline section 45, kept within the range 0.2' to 26'. This clearance angle is the angle of rotation where from the state in which the surface of one side in the circumferential direction of the female spline teeth of the female spline section 44 comes in contact with the surface of one side in the circumferential direction of the male spline teeth of the male spline section 45, only one of the spline sections is rotated toward the clearance to the state in which the surfaces of the other sides in the circumferential direction of the teeth of the female and male splines come in contact with each other.

A 0.2' to 26' clearance corresponds to a clearance having a width of approximately 0.001 mm to 0.10 mm on the pitch circle of a bearing unit for wheel drive of a normal automobile.

In other words, the clearance width in the circumferential direction on the pitch circle in the spline connection 46 between the female spline section 44 and the male spline section 45 is desirably limited to the range of 0.001 mm to 0.10 mm.

The clearance width in the circumferential direction is the distance between the opposite side surfaces in the circumferential direction of the male and female spline teeth in the state where the side surface in the circumferential direction of the male spline teeth of the female spline section 44 is engaged with the side surface in the circumferential direction of the male spline teeth of the male spline section 45.

As shown in FIG. 1, in the unit for driving wheels of this embodiment, the bearing unit or axle unit 52 for wheel drive, constructed as described above, is combined with the transmission shaft 53 and the first constant-velocity joint 51, that is a tripod-type constant-velocity joint on the differential side. In other words, a male spline section 56 that is formed on the outside end of the transmission shaft 53 is engaged through spline fit with a second spline hole 55 that is formed in the center of the inner race 54 of the constant-velocity joint of the bearing unit 52 for wheel drive. Moreover, a retaining ring 58, that fits into a fitting groove 57 that is formed all the way around the outer peripheral surface on the outside end of the male spline section 56, is engaged with a fitting groove 59 that is formed on the peripheral edge of the opening on the outside end of the second spline hole 55, so as to prevent the male spline section 56 from coming out of the second spline hole 55.

Furthermore, the inside end of the transmission shaft 53 is fastened to the center of the trunnion 60 of the constant-velocity joint 51 on the differential side that is formed on the output shaft of the differential gear.

In other words, the inside end of the transmission shaft 53 is connected to the center of the trunnion 60 of the constant-velocity joint 51 on the differential side that is formed on the end of the output shaft of the differential gear that is not shown in the figure.

Moreover, there is a pair of boots 62a, 62b for preventing grease from leaking out and dirt from getting inside, that are fastened between the outer peripheral surface in the center of the transmission shaft 53 and the outer peripheral surface on the outside end of the housing 61 of the constant-velocity joint 51 on the differential side and the outer peripheral surface on the inside end of the housing section 11 of the constant-velocity joint 10 on the bearing side, respectively. These boots 62a, 62b have a bellows in the center and are entirely cylindrical shaped.

In the case of the drive unit for wheel of the present invention, or specifically the bearing unit 52 for wheel drive or axle unit for wheel drive of this embodiment, constructed as described above, torque is transmitted between the drive member 28 and the hub 6 by spline connection section 46 between the male spline section 45 that is formed around the outer peripheral surface of the spline shaft 29 and the female spline section 44 that is formed around the inner peripheral surface of the spline hole 27. Therefore, it is not necessary to perform processing such as build-up welding, as in the case of the first example of prior construction shown in FIG. 6, in order to positively transmit torque between the drive member 28 and the hub 6. Such processing may be the cause of heat deformation. As a result, it is possible to maintain durability of all parts of the bearing unit, including the inner-ring raceways 8.

Furthermore, in the case of the bearing unit 52 for wheel drive or axle unit for wheel drive of this embodiment, the clearance angle or clearance width in the circumferential direction of the spline connection section 46 is properly regulated, so that there is no adverse effects on assembly work, while it is possible to prevent the surface on the side in the circumferential direction of the male spline teeth of the male spline section 45 from hitting with great momentum the surface on the side of the female spline teeth of the female spline section 44. In addition, it is possible to prevent the generation of unpleasant noise.

In other words, the clearance angle is 0.2' (corresponding to 0.001 mm of the clearance width on the pitch circle) or greater, so that the fit condition between the male spline section 45 and the female spline section 44 is not of the interference fit. Also, the spline shaft 29 can be inserted easily into the spline hole 27 without receiving large friction resistance. Therefore, the work of making the spline connection between the male and female spline sections 45, 44 when inserting the spline shaft 29 into the spline hole 27 can be performed easily without the use of special assembly equipment.

On the other hand, the clearance angle is kept to 26' (corresponding to 0.10 mm of the clearance width on the pitch circle) or less, so that the surfaces on the sides in the circumferential direction of the male and female spline teeth of the male and female spline sections 45, 44 do not hit each other with great momentum at the beginning of acceleration or deceleration, and thus it is possible to prevent the generation of noise that is unpleasant to the driver.

In other words, the inventors performed tests at thirteen clearance angles: 0' (0 mm of clearance width on the pitch circle), 0.2' (0.001 mm), 3' (0.01 mm), 8' (0.03 mm), 16' (0.06 mm), 26' (0.10 mm), 31' (0.12 mm), 34' (0.13 mm), 39' (0.15 mm), 42' (0.16 mm), 44' (0.17 mm), 47' (0.18 mm), and 52' (0.2 mm), in order to know what effect the size of the clearance angle of the spline connection 46 has on the generation of noise during transmission of torque between the drive member 28 and the hub 6. In the tests, an operation to drive and rotate the drive member 28 (state corresponding to driving to move the vehicle) and a state where resistance was applied against the rotation of the drive member 28 (state corresponding to the engine brake operation) were repeated, and whether or not noise was generated from the bearing unit for driving the wheel due to metal impact was checked by ear.

The results showed that at a clearance angle of 26' (corresponding to 0.10 mm on the pitch circle) or less, noise was not generated, or if noise were generated it was at a level that was cause no problem. On the other hand, when the clearance angle was 31' or greater (corresponding to 0.12 mm or greater on the pitch circle), unpleasant noise was generated. However, even when the clearance angle exceeded 26', as long as it was 42' or less, the noise level remained at a level that would cause no practical problems. On the other hand, when the clearance angle was 0' (corresponding to 0 mm of the clearance width on the pitch circle), the work of inserting the spline shaft 29 into the spline hole 27 became troublesome, and there was an adverse effect on the assembly work of the bearing unit 52 for driving the wheel.

Moreover, in the case of this embodiment, when the drive member 28 is assembled with the hub 6, the O-ring 40 is pre-loaded with a load of 9.8 to 147 N (1 to 15 kgf) or preferably, a load of 29.4 to 147 N (3 to 15 kgf), so that the work of connecting the drive member 28 and the hub 6 with the retaining ring 15*b* is not troublesome, while it is possible to prevent any backlash of the spline shaft 29 and spline hole 27 in the axial direction. In addition, in the case of this embodiment, it is possible to prevent unpleasant noise due to backlash in the axial direction while the automobile is running.

Figure 3:
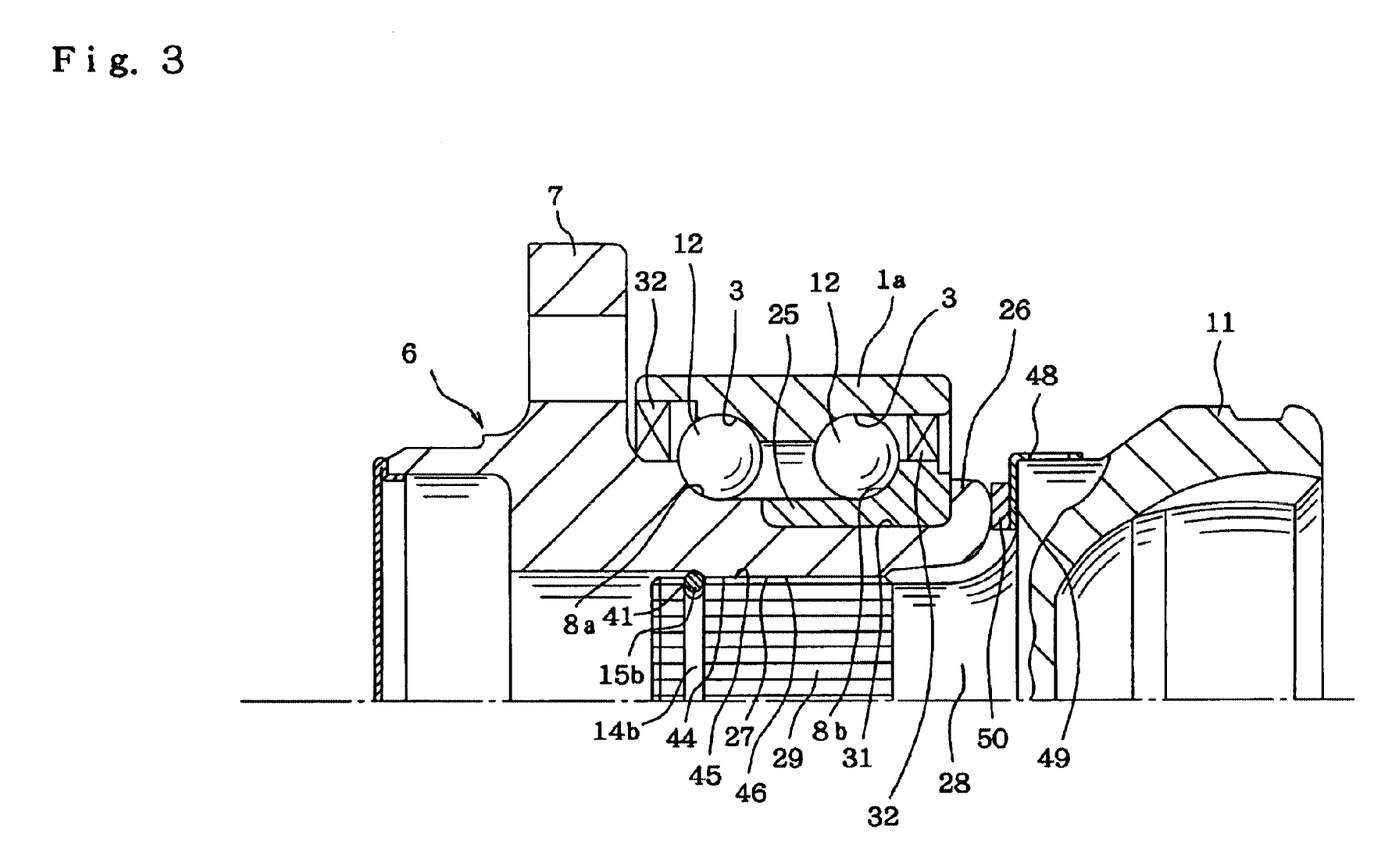
FIG. 3 is a partly cut-away, cross sectional view of a half of bearing unit for wheel drive of a second example of the embodiment of the present invention in the left end portion thereof.

Next, FIG. 3 shows a second embodiment of the invention. Similar to the third example of prior construction shown in FIG. 8, in this embodiment, the outside inner-ring raceway 8*a* is formed directly on the outer peripheral surface in the middle of the hub 6, and the inside inner-ring raceway 8*b* is formed around the outer peripheral surface of an inner race 25 that fits around a small-diameter stepped section 31 that is formed around the outer peripheral surface on the inside end of the hub 6, and the surface on the inside end of this inner race 25 is held by a crimped section 26.

Also, in this embodiment, there is a ring shaped metal core piece 49 having an L-shaped cross section and comprising an encoder 48 located in the middle of the drive member 28, that is the outside end of the housing section 11 so as to detect the rpm of the drive member 28.

Also, a ring-shaped elastic plate 50 that is attached to the outside surface of this metal core piece 49 is held between the surface on the outside end of the housing section 11 and the end surface of the crimped section 26 such that it is elastically compressed so as to provide a seal between the surface on the outside end of the housing 11 and the end surface of the crimped section 26.

In the case of this embodiment as well, the clearance angle of the spline connection 46, where the female spline section 44 that is formed on the inner peripheral surface of the spline hole 27 that is formed in the center of the hub 6 makes an engagement with the male spline section 45 that is formed on the outer peripheral surface of the spline shaft 29 of the drive member 28, is kept within the range of 0.2' to 42' (corresponding to a clearance width in the circumferential direction of 0.001 mm to 0.16 mm on the pitch circle). The range of clearance angle from 0.2' to 26' (corresponding to a clearance width in the circimferential direction of 0.001 mm to 0.1 mm on the pitch circle) is further desirable. Also, the range of clearance angle within the range of 3' to 26' (clearance width on the pitch circle from 0.01 mm to 0.10 mm) is further desirable.

Also, the elasticity and amount of elastic compression of the elastic plate 50 is properly regulated such that this elastic plate 50 applies a thrust load on the hub 6 of 9.8 to 147 N. Therefore, in this embodiment as well, any backlash in the direction of rotation and axial direction of the connection between the hub 6 and drive member 28 is suppressed, and it is possible to perform the work of connecting these members 6, 28 easily and at the same time to prevent the generation of unpleasant noise while the automobile is running.

This invention can also be embodied using the basic construction of the second example of prior construction shown in FIG. 7, or the third example of prior construction shown in FIG. 8.

In the case of the basic construction of the third example of prior construction shown in FIG. 8, a first spline section or radially outer male spline section 35 that is formed around the first fitting surface or outer peripheral surface of an auxiliary ring 33 makes a spline connection with a second spline section or radially outer female spline section 37 that is formed around the second fitting surface or inner peripheral surface of the outside end of the housing section 11 that is formed on the drive member. And, the clearance angle of the spline connection is kept within the range of 0.2' to 42', and preferably 0.2' to 26'.

In the case of the construction shown in FIG. 8, the diameter of the pitch circle of the spline connection for a normal automobile is about 55 mm, which is larger than in the first and second examples. It is therefore possible to increase the clearance width in the circumferential direction even for the same clearance angle.

For example, in the case of the first and second examples previously described, in order to keep the clearance angle up to 26', it is necessary to keep the clearance width of the pitch circle up to 0.10 mm. On the other hand, in the case of the basic construction shown in FIG. 8 described above, if the clearance width of the pitch circle is kept up to 0.208 mm, it is possible to keep the clearance angle up to 26'. This simplifies processing of the radially outer male spline section 35 and the radially outer female spline section 37.

Figure 4:
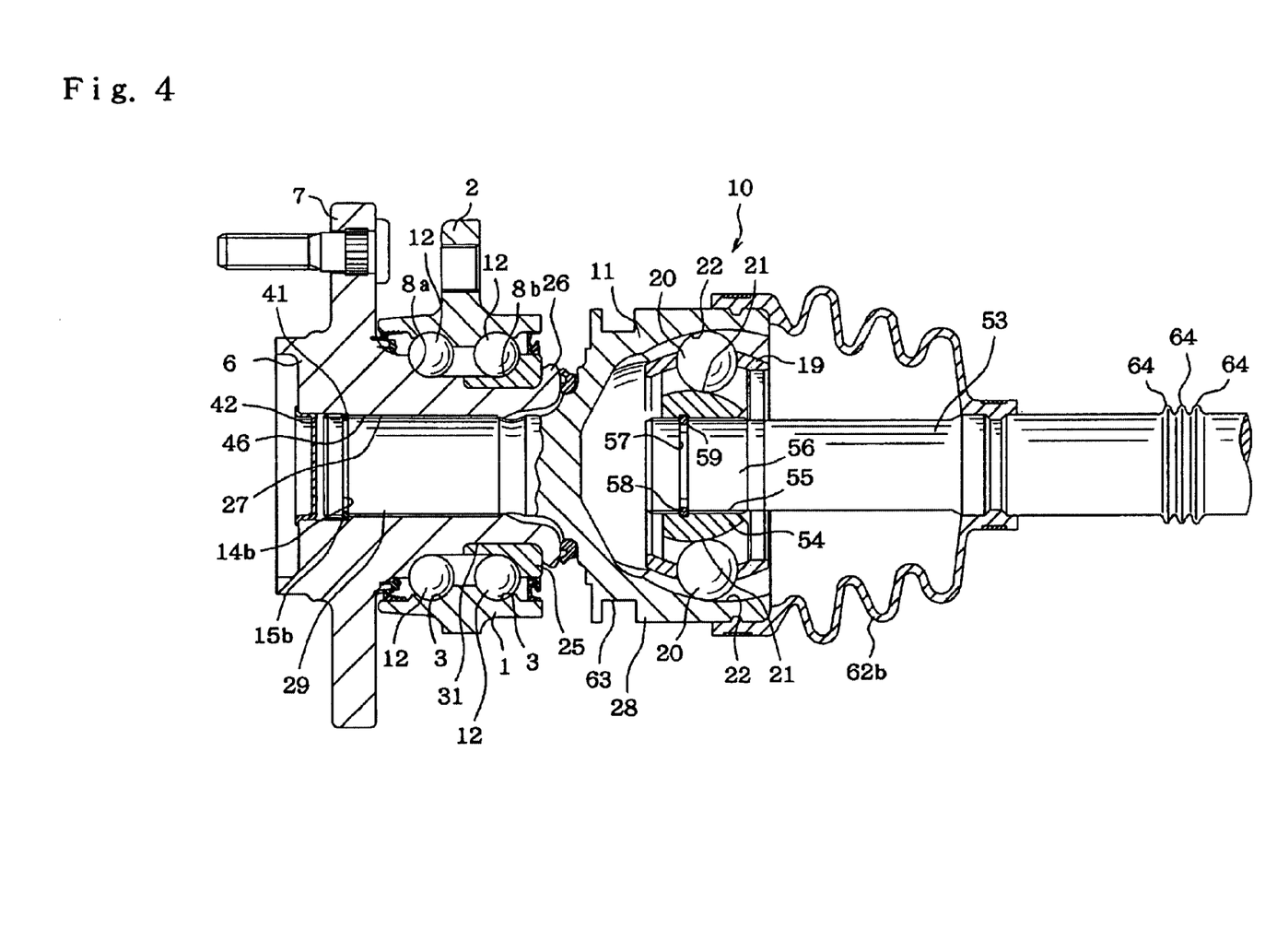
FIG. 4 is a partly cut-away, cross sectional view of a half of bearing unit for wheel drive of a third example of the embodiment of the present invention.

Next, FIG. 4 shows a third embodiment of the invention. In this embodiment, a fitting groove 63 is formed on the outer peripheral surface of the housing section 11 of the drive member 28 of the constant-velocity joint 10 on the bearing side, and fitting protrusions 64 are formed on the outer peripheral surface in the middle of the transmission shaft 53. This fitting groove 63 and fitting protrusions 64, are formed so that when an assembly robot is used to insert the spline shaft 29 that is formed on the outside end of the drive member 28 into the spline hole 27 that is formed in the center of the hub 6, the robot arm is engaged with the groove 63 and protrusions 64 so that there is no slippage between the robot arm and the housing section 11 and transmission shaft 53.

Instead of the fitting groove 63 and fitting protrusions 64, it is also possible to form a minute land and recess section using knurling processing on part of the outer peripheral surface of the housing section 11 and transmission shaft 53 for the robot arm to grip so that there is no slippage of the housing section 11 and transmission shaft 53.

In the example shown in the figure, in order for it to be possible to fit the robot arm to either the drive member 28 or transmission shaft 53, a fitting groove 63 is formed around the outer peripheral surface of the housing section 11 and a fitting protrusions 64 are formed around the outer peripheral surface in the middle of the transmission shaft 53. However, in an actual case, it is possible to form a fitting groove or fitting protrusions on just one or the other.

When forming an engagement section such as a fitting groove 63, fitting protrusions 64 or a fine land and recess section for the robot arm to fit with, this engagement section is grasped by the robot arm when performing assembly work, it is also possible to automatically check whether or not the assembly work is performed properly. For example, when the spline shaft 29 is sufficiently inserted into the spline hole 27 with the hub 6 supported so that it does not move in a retracting direction (left in FIG. 4) when connecting the hub 6 with the drive member 28, the coupling member or retaining ring 15b and stepped section 41 are automatically connected with each other as the diameter of the retaining ring 15b elastically expands. In this engagement state, the spline shaft 29 will not come out of the spline hole 27.

Moreover, when the male spline section 56 that is formed on the end of the transmission shaft 53 is sufficiently inserted into the inner race 54 for this constant-velocity joint in order to connect the transmission shaft 53 with the inner race 54 for the constant-velocity joint, the coupling member or retaining ring 58 and fitting groove 59 are automatically connected to each other. In this state, the end of the transmission shaft 53 will not come out from the inner race 54 for the constant-velocity joint. Also, the transmission shaft 53 will not move further in the insertion direction from the connected position, and the transmission shaft 53 and inner race 54 for the constant-velocity joint are connected to each other in a state that displacement is prevented in the axial direction.

After the assembly robot grasps the engagement section and performs assembly, by applying a force with the robot arm that is smaller than the strength of the retaining rings 15b, 58 to the pair of connected members (hub 6 and drive member 28, or transmission shaft 53 and inner race 54 for the constant-velocity joint) in a direction that would separate them, it is possible to check whether or not the retaining rings 15b, 58 are connected properly. Of course, when doing this, the hub 6 is supported so that it is not pulled by the drive member 28 and moved to the right direction in FIG. 4.

Moreover, the construction of forming the engagement section such as the fitting groove 63, fitting protrusions 64 or minute land and recess section for fitting with the robot arm, can be achieved by the first thru third examples of prior construction shown in FIGS. 6 thru 8, as well as by the first and second embodiments of the invention shown in FIGS. 1 thru 3. Of these, forming the engagement section for the construction shown in FIGS. 1 thru 3 and FIGS. 6 and 7, is performed in the same way as done in the third embodiment of the invention described above, so a fourth embodiment of the invention will be explained using FIG. 5 for the case of forming the engagement section for the third example of prior construction shown in FIG. 8.

Figure 5:
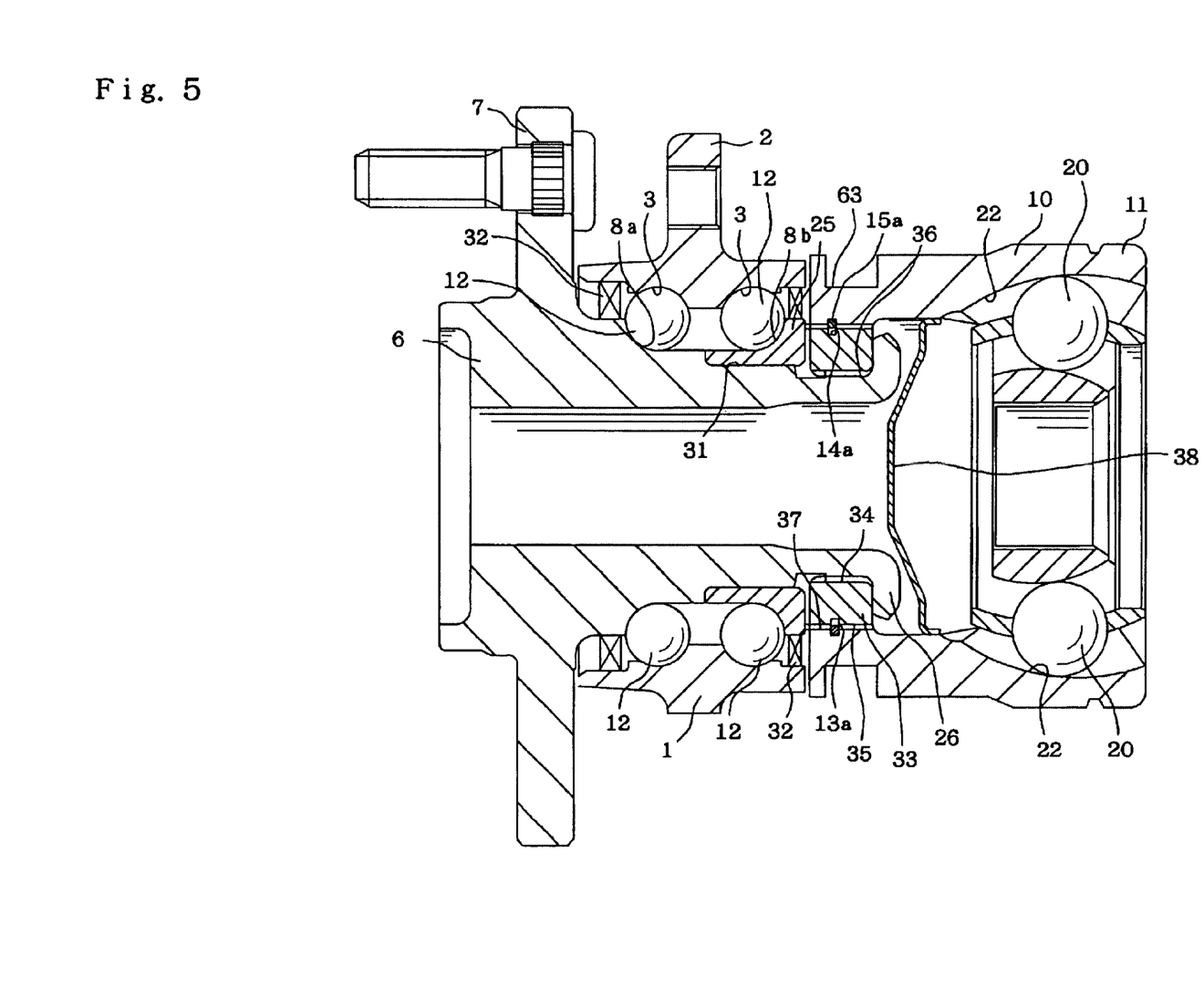
FIG. 5 is a partly cut-away, cross sectional view of a half of bearing unit for wheel drive of a fourth example of the embodiment of the present invention in the left end portion thereof.

In this embodiment, the outside end of the housing section 11 of the constant-velocity joint 10 on the bearing side is somewhat thick, and the engagement section or fitting groove 63 is formed on the outer peripheral surface of this portion. In the case of this embodiment, the housing section 11 is grasped by the robot arm at this fitting groove 63, and the spline connection between the outer-diameter side female spline section 37, that is formed on the inner peripheral surface on the outside end of the housing section 11, and the outer-diameter male spline section 35, that is formed on the outer peripheral surface of the auxiliary ring 33, is performed automatically by the assembly robot.

In this embodiment as well, when the radially outer female spline section 37 is engaged through sufficient spline-connection with the radially outer male spline section 35, the retaining ring 15a is placed between and engaged with the outside fitting groove 13a and inside fitting groove 14a, so that the housing section 11 can not come apart from the auxiliary ring 33.

By using the robot arm to pull on the housing section 11 with a force smaller than the strength of the retaining ring 15a in a direction that would separate it from the auxiliary ring 33, it is possible to check whether or not the housing section 11 is sufficiently connected to the auxiliary ring 33.

The present invention can be achieved on the basis of the third conventional example as shown in FIG. 8. In this case, the first spline section or radially outer male spline section 35 on the outer peripheral surface of the auxiliary ring or first fitting surface 33 is engaged with the second spline section or radially outer female spline section 37 on the inner peripheral surface at the outside end of the housing section 11 with the clearance width controlled in the range of between 0.001 mm and 0.1 mm in the case of the about 26 mm diameter of the pitch circle of the spline connection and in the range of between 0.02 mm and 0.208 mm in the case of the about 55 mm diameter of the pitch circle of the spline connection.

When this invention is applied to any of the forms described above, the aspects and specifications of the first and second spline sections are arbitrary. For example, the surfaces of both the first and second spline sections may be hardened by quenching, or kept as they are without being hardened by quenching, or it is also possible for just one of the surfaces to be hardened by quenching. Also, the shape of the splines can be such that they belong to the group of serration having a fine pitch, and the shape of the cross section can be any conventional shape such as triangular teeth or involute teeth.

Moreover, grease containing a high-pressure additive can be filled in the spline connection section where the first and second spline sections are engaged with together, in order to prevent friction wear in the spline connection section. In this case, prevention of friction wear can be further improved by quenching both the first and second spline sections. Also, the shape of the spline teeth in the axial direction can be such that the surfaces on both sides in the circumferential direction of the teeth run parallel to each other, or they can be tapered teeth where the surfaces on both sides in the circumferential direction are slightly angled.

In this case, by making the spline section formed on the inner peripheral surface parallel splines and the spline section formed on the outer peripheral surface angled or tapered splines, it is possible to make the minimum value of the clearance angle be negative, as described on the third feature, and form a slightly interfering fit in the spline connection.

When both of the female spline section 44 and male spline section 45 have involute-shaped serration, it is possible to apply the specifications given in Table 1 below. The abbreviation D.P. in Table 1 below stands for diametral pitch.

TABLE 1

Specifications for Involute Serration

| | Female serration section | Male serration section |
|---|---|---|
| D.P. | 24/48 | 24/48 |
| Module | 1.0583 | 1.0583 |
| No. of teeth | 25 | 25 |
| Pressure angle | 45° | 45° |
| Large diameter | $27.340_0^{+0.1}$ | $26.916_{-0.150}^{0}$ |
| Small diameter | $25.823_0^{+0.13}$ | $25.400_{-0.200}^{0}$ |
| Base circle diameter | 18.709 | 18.709 |
| Reference pitch-circle diameter | 26.458 | 26.458 |
| Surface roughness-of teeth | 16S | Rolled |
| Over pin diameter | $22.014_{-0.07}^{0}$ | $29.797_0^{+0.05}$ |
| Pin diameter | 2.598 | 2.032 |
| Bottom corner-of teeth | R-shape not possible | |

When applying this invention, it is possible to form the inner-ring raceways integral with the hub or keep them separate, and similarly, it is possible to form the outer-ring raceways integral with the main body that is fixed to the suspension or keep them separate.

This invention, constructed and functions as described above, makes possible a low-cost drive unit for wheels that is compact and lightweight, and which has excellent durability and reliability, and contributes to the improvement of comfort, power performance and efficiency of fuel consumption of an automobile. Moreover, this invention is capable of preventing impact between components during operation, and thus prevents the generation of unpleasant noise and vibration, which improves the comfort of an automobile in which the drive unit for wheel is installed, and further improves the durability of this drive unit for wheel.

What is claimed is:

1. A method of assembling a wheel drive unit comprising a rolling-bearing unit for supporting a wheel, a constant-velocity joint unit and a coupling member, to be connected to a differential gear having an output section, the constant-velocity joint unit comprising a first constant-velocity joint having an output section and an input section, the input section being connected to the output section of the differential gear, a transmission shaft having an output end and an input end, the input end of the transmission shaft being connected to the output section of the first constant-velocity joint, and a second constant-velocity joint having an input section connected to the output end of the transmission shaft, the rolling-bearing unit for supporting the wheel comprising an outer race having an outside end and being not rotatable even during use, a hub having an inside end and an outside end and a plurality of rolling bodies, the outer race having an inner peripheral surface formed with an outer-ring raceway thereon, the hub having an outer peripheral surface and comprising an installation flange for supporting the wheel, the installation flange being formed on the outer peripheral surface of the hub near the outside end on a portion that protrudes outward from the outside end of the outer race toward the outside, an inner-ring raceway that is formed near the inside end of the hub directly on the hub or by way of an inner race, such that the inner-ring raceway faces the outer-ring raceway, and a first fitting peripheral surface formed with a first spline section, the rolling bodies being rotatably located between the outer-ring raceway and the inner-ring raceway, the second constant-velocity joint comprising a second fitting peripheral surface located at an outside end thereof where the second spline section is engaged with the first spline section through a spline connection, and a housing section formed on an inside end thereof so as to function as an outer ring of the second constant-velocity joint, the coupling member being adapted to deform elastically in the radial direction and located between and engaged with the first engagement section formed on the peripheral surface of the hub and the second engagement section formed on the peripheral surface of the second constant-velocity joint so as to position the hub and second constant-velocity joint in the axial direction, wherein the spline connection between the first and second spline sections engaged with each other is regulated in a clearance angle, wherein at least one of the transmission shaft and the second constant velocity joint including the housing section has an outer peripheral surface formed with an engagement portion, so that when the second constant velocity joint is spine-connected to a rolling bearing unit for supporting a wheel, at least one of the transmission shaft and the second constant velocity is engaged with a robot arm to prevent the robot arm from being axially displaced with reference to the at least one of the transmission shaft and the second constant velocity joint, the method comprising the steps of:

grasping the engagement portion formed on the outer peripheral surface of the at least one of the transmission shaft and the second constant-velocity joint, supporting the rolling bearing unit for drive wheel so as not to be displaced in the retracting direction following the displacement of the robot arm, and then in this state displacing the robot arm, and making the second constant-velocity joint engaged with the rolling bearing unit for supporting the wheel through spline connection, wherein in the state where the second constant velocity joint is engaged with the rolling bearing unit for supporting the wheel through spline connection, coupling the second constant velocity joint to the rolling bearing unit for wheel support with a coupling member based on the elastic deformation thereof, and then using the robot arm to apply a force smaller than the strength of the coupling member in the direction to separate the second constant-velocity joint from the rolling bearing unit for wheel support, so as to check whether the coupling with the coupling member is securely conducted.

* * * * *